United States Patent
Kanai (10) Patent No.: US 10,866,655 B2
(45) Date of Patent: Dec. 15, 2020

(54) TOUCHPAD MODULE

(71) Applicants: Nidec Corporation, Kyoto (JP); Nidec Seimitsu Corporation, Ueda (JP)

(72) Inventor: Naoki Kanai, Ueda (JP)

(73) Assignees: NIDEC CORPORATION, Kyoto (JP); NIDEC SEIMITSU CORPORATION, Nagano (JP)

( * ) Notice: Subject to any disclaimer, the term of this patent is extended or adjusted under 35 U.S.C. 154(b) by 0 days.

(21) Appl. No.: 16/200,685

(22) Filed: Nov. 27, 2018

(65) Prior Publication Data

US 2019/0163294 A1    May 30, 2019

(30) Foreign Application Priority Data

Nov. 29, 2017  (JP) .................... 2017-229276

(51) Int. Cl.
*G06F 3/0354* (2013.01)
*G06F 3/01* (2006.01)
*G06F 1/16* (2006.01)

(52) U.S. Cl.
CPC .......... *G06F 3/03547* (2013.01); *G06F 1/169* (2013.01); *G06F 3/016* (2013.01)

(58) Field of Classification Search
CPC ....... G06F 1/169; G06F 3/016; G06F 3/03547
See application file for complete search history.

(56) References Cited

U.S. PATENT DOCUMENTS

| | | | |
|---|---|---|---|
| 9,471,169 B2 * | 10/2016 | Schediwy | G06F 3/0412 |
| 10,331,265 B2 * | 6/2019 | Rosenberg | G06F 3/04883 |
| 2010/0079404 A1 | 4/2010 | Degner et al. | |
| 2015/0185779 A1 * | 7/2015 | Doi | G10K 11/002 361/679.1 |
| 2017/0285848 A1 * | 10/2017 | Rosenberg | G06F 3/016 |

* cited by examiner

*Primary Examiner* — Afroza Chowdhury
(74) *Attorney, Agent, or Firm* — Keating & Bennett (57) ABSTRACT

A touchpad module includes an outer frame, a support disposed inside the outer frame, a spring that connects the outer frame and the support to each other, a substrate fixed to and supported by the support, and a vibration motor mounted on the substrate, in which a vibration direction of the vibration motor and an urging direction of the spring coincide in a lateral direction.

12 Claims, 5 Drawing Sheets

TOUCHPAD MODULE

CROSS REFERENCE TO RELATED APPLICATIONS

This application claims the benefit of priority to Japanese Patent Application No. 2017-229276 filed on Nov. 29, 2017. The entire contents of this application are hereby incorporated herein by reference.

BACKGROUND OF THE INVENTION

1. Field of the Invention

The present invention relates to a touchpad module.

2. Description of the Related Art

To date, a sensor device called a touchpad has been provided in various devices such as notebook PCs, tablet computers, smartphones, and the like. The touchpad is a device that detects the position of a finger of an operator who moves his or her finger on a planar sensor. An example of an input device using a touchpad is disclosed in Japanese Unexamined Patent Application Publication No. 2012-504275.

In the input device of Japanese Unexamined Patent Application Publication No. 2012-504275 (FIG. 5, FIG. 6, and the like), a mechanical switch is provided at the bottom of a track pad (touchpad). The track pad is connected to the frame by a flexible hinge. The flexible hinge is an elastic member that flexes when a force is applied thereto and generates a restoring force so as to return the track pad to the neutral position. When the operator presses the track surface of the track pad, the track pad rotates downward and the mechanical switch operates. By the operation of the mechanical switch, a button signal is generated.

In the input device of Japanese Unexamined Patent Application Publication No. 2012-504275, when the track pad is pushed down, the operator can obtain a click feeling with the mechanical switch. However, in recent years, a technique has also been developed, by using a vibration device that gives vibration to the touchpad, that gives the operator haptic feedback of a click feeling like that of a physical button being pressed by the operator. However, the existing vibration device is not easy to assemble and cost reduction is desired.

SUMMARY OF THE INVENTION

In view of the above circumstances, preferred embodiments of the present invention provide touchpad modules capable of increasing vibration output while improving ease of assembly.

An exemplary touchpad module of the present invention is a touchpad module for vibrating a touchpad. The touchpad module includes an outer frame, a support disposed inside the outer frame, a spring that connects the outer frame and the support to each other, a substrate fixed to and supported by the support, and a vibration motor mounted on the substrate, in which a vibration direction of the vibration motor and an urging direction of the spring coincide in a lateral direction.

According to exemplary touchpad modules of the present invention, it is possible to increase the vibration output while improving the ease of assembly.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Exemplary embodiments of the present invention will be described below with reference to the drawings. Further, in the present embodiment, in the drawings, the lateral direction is defined as the X direction, the longitudinal direction perpendicular to the lateral direction is defined as the Y direction, and the top-bottom direction perpendicular to the lateral direction and the longitudinal direction is defined as the Z direction. To be more specific, it is assumed that one side in the lateral direction is X1, the other side in the lateral direction is X2, one side in the longitudinal direction is Y1, the other side in the longitudinal direction is Y2, the upper side is Z1, and the lower side is Z2. Further, note that each of the above directions defining the touchpad module to be described does not indicate a positional relationship and a direction when the touchpad module is incorporated in an actual device.

Figure 1:
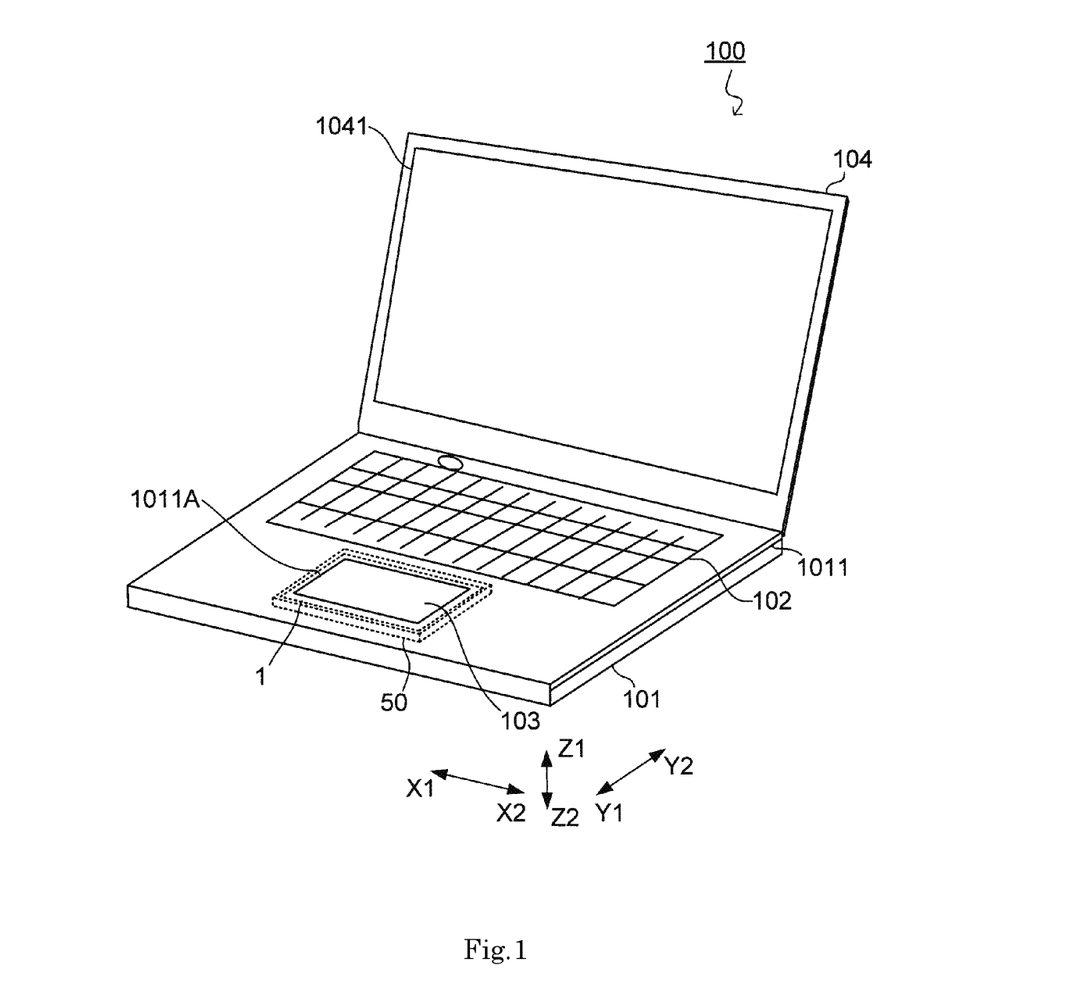
FIG. 1 is an overall perspective view schematically illustrating an appearance of a notebook PC according to an exemplary embodiment of the present invention.

First, a notebook PC will be described as an example of a device on which the touchpad module according to the present embodiment described below is mounted. FIG. 1 is an overall perspective view schematically illustrating an appearance of a notebook PC 100 according to an exemplary embodiment. The notebook PC 100 illustrated in FIG. 1 includes a casing 101, a keyboard 102, a touchpad 103, and a display unit 104.

The casing 101 houses the keyboard 102 and is installed on a desk. The display unit 104, which includes a display screen 1041, is connected to the casing 101 to be rotatable at one end portion, and the notebook PC 100 can be changed between a closed state in which the display unit 104 covers the keyboard from above and an open state in which the display screen 1041 can be viewed.

The casing 101 includes a casing upper portion 1011 at an upper portion thereof. The casing upper portion 1011 has an upper surface portion where the keyboard 102, which extends in the longitudinal and lateral directions, is exposed upward and has an opening portion 1011A in the upper surface portion on one side of the keyboard 102 in the longitudinal direction. The opening portion 1011A is a hole penetrating in the top-bottom direction.

The touchpad 103 is disposed on the lower side of the opening portion 1011A and is exposed upward through the opening portion 1011A. That is, the user using the notebook PC 100 can bring his or her finger into contact with the touchpad 103 located on the user side of the keyboard 102. The touchpad 103 has a planar sensor that extends in the longitudinal and lateral directions and detects the position, on a plane, of the finger in contact with the sensor. For position detection, for example, an electrostatic capacitance method is used.

The notebook PC 100 includes a touchpad module 1. The touchpad module 1 vibrates the touchpad 103 in the lateral direction. The touchpad module 1 is held by a holder 50. The holder 50 is fixed to the casing upper portion 1011. Further, the method for holding the touchpad module 1 and the method for fixing the holder 50 will be described later.

The touchpad module 1 can give haptic feedback to a user who brings his or her finger into contact with the touchpad 103 by applying lateral vibration to the touchpad 103. For example, when pressing by a finger is detected by a pressure sensor (not illustrated) of the touchpad 103, the touchpad 103 is made to vibrate by the touchpad module 1, and the user can obtain a click feeling as if the touchpad 103 were pushed in.

That is, in the notebook PC 100, various operations can be performed by moving a finger on the touchpad 103 to move a cursor on the display screen 1041 in accordance with the detection of the position of the finger, and by pressing the touchpad 103 with the finger for a click.

Further, besides the click feeling, for example, haptic feedback such as a smooth feeling of an object surface, a rough feeling of an object surface, or the like can be given to the user, by vibration of the touchpad 103.

Figure 2:
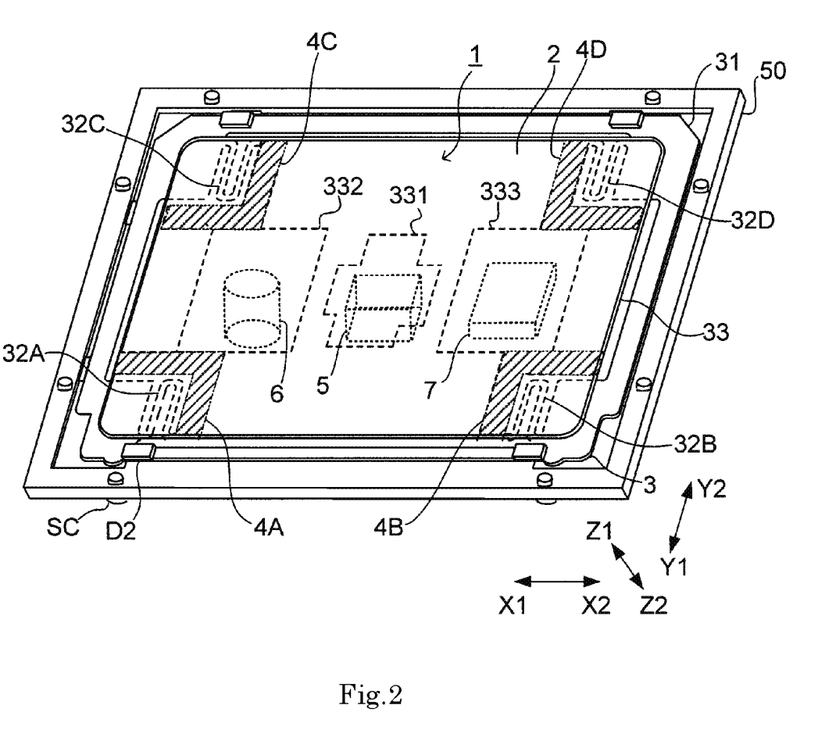
FIG. 2 is a perspective view illustrating a configuration of a touchpad module and a holder.

Next, the configuration of the touchpad module 1 will be specifically described. FIG. 2 is a perspective view illustrating the configuration of the touchpad module 1 and the holder 50. The touchpad module 1 includes a substrate 2 and a plate portion 3.

Figure 3:
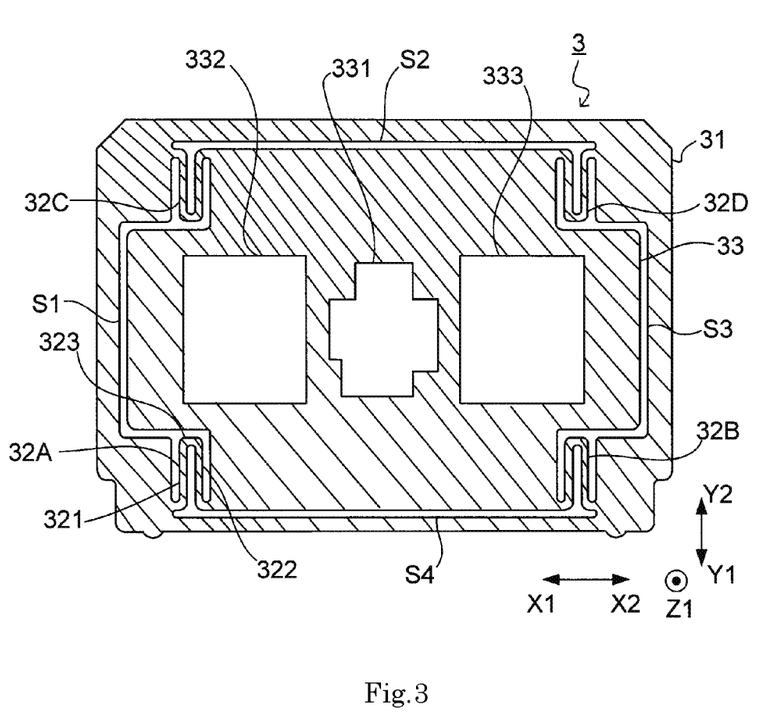
FIG. 3 is a plan view of a plate portion as viewed from above.

FIG. 3 is a plan view of the plate portion 3 as viewed from above. With regard to the configuration of the plate portion 3 described with reference to FIG. 3, the plate portion 3 has an outer frame portion 31, spring portions 32A to 32D, and a support portion 33.

The outer frame portion 31, the spring portions 32A to 32D, and the support portion 33 are formed as one plate-like member. That is, the plate portion 3 can be formed by punching from one plate and productivity can be improved. In addition, the thickness of the touchpad module 1 can be reduced by using the plate portion 3. The plate portion 3 is formed of, for example, SUS material.

The outer frame portion 31 (outer frame plate) surrounds the outer side of the support portion 33 and is separated from the support portion 33 with gaps S1 to S4 in between. The spring portions 32A to 32D connect the outer frame portion 31 and the support portion 33 to each other. The support portion 33 (inner plate) has a substantially cross-like shape including a laterally extending portion and a longitudinally extending portion.

Each of the spring portions 32A to 32D has a bent shape. With regard to the structure of the spring portion 32A, the spring portion 32A has a straight portion 321 that extends in the longitudinal direction, a straight portion 322 that extends in the longitudinal direction, and a bent portion 323 that connects the straight portions 321 and 322 to each other. The straight portions 321 and 322 face each other in the lateral direction. An end portion of the straight portion 321 on the other side in the longitudinal direction and an end portion of the straight portion 322 on the other side in the longitudinal direction are connected in the lateral direction by the bent portion 323. The other end portion of the straight portion 321 on the one side in the longitudinal direction is connected to a corner portion of the outer frame portion 31 on the one side in the lateral direction and on the one side in the longitudinal direction. The other end portion of the straight portion 322 on the one side in the longitudinal direction is connected to a corner portion of a portion of the support portion 33, which extends in the longitudinal direction, on the one side in the lateral direction and on the one side in the longitudinal direction.

As illustrated in FIG. 3, the configurations of the spring portions 32B to 32D other than the spring portion 32A are similar to that of the spring portion 32A described above and thus will not be described in detail. The spring portion 32B connects the outer frame portion 31 and the support portion 33 to each other at a corner of the plate portion 3 on the other side in the lateral direction and on the one side in the longitudinal direction. The spring portion 32C connects the outer frame portion 31 and the support portion 33 to each other at a corner of the plate portion 3 on the one side in the lateral direction and on the other side in the longitudinal direction. The spring portion 32D connects the outer frame portion 31 and the support portion 33 to each other at the corner of the plate portion 3 on the other side in the lateral direction and on the other side in the longitudinal direction.

The support portion 33 is supported by the spring portions 32A to 32D so as to be capable of vibrating in the lateral direction with respect to the outer frame portion 31. The urging direction of each of the spring portions 32A to 32D is the lateral direction.

As illustrated in FIG. 2, the substrate 2 is fixed to and supported by the support portion 33. The substrate 2 is disposed on the upper side of the support portion 33. The substrate 2 is fixed to the support portion 33 by adhesive tapes 4A to 4D. That is, the adhesive tapes 4A to 4D are interposed in the top-bottom direction by the substrate 2 and the support portion 33.

The adhesive tape 4A is a substantially L-shaped tape that is affixed to the support portion 33 along a notch portion of the support portion 33 on the one side in the lateral direction and the one side in the longitudinal direction. Similarly, the adhesive tapes 4B to 4D are affixed along remaining notch portions of the support portion 33. Due to the thicknesses of the adhesive tapes 4A to 4D, the adhesive tapes 4A to 4D function as spacers for upwardly separating the substrate 2 from the support portion 33. Accordingly, when the substrate 2 vibrates as described later, rubbing of the substrate 2 against the outer frame portion 31 can be avoided. In addition, fixing of the substrate 2 is facilitated with the adhesive tapes 4A to 4D. Further, note that the substrate 2 may be fixed to the support portion 33 by screws with spacers in between. As a result, the fixing strength can be improved.

A vibration motor 5 and electronic components 6 and 7 are mounted on the substrate 2. The vibration motor 5 is a lateral linear vibration motor having a substrate portion and a vibrating body (that are not illustrated) vibrating in a direction parallel to the substrate portion. For example, the vibrating body is vibrated by the interaction between an electromagnetic force, which is generated in a coil by a current supplied through the substrate portion, and a magnet. In FIG. 2, the vibrator vibrates in the lateral direction. Further, note that the vibration motor is not limited to the above and may be constituted by a longitudinal linear vibration motor, an eccentric vibration motor, or the like.

The vibration motor 5 is mounted on the lower surface side of the substrate 2 and protrudes downward. Here, as also illustrated in FIG. 3, a vibration motor avoidance hole 331 is formed in the support portion 33. The vibration motor avoidance hole 331 is a through hole having a substantially cross-like shape and penetrating in the top-bottom direction, and is located at the center of the support portion 33. The vibration motor 5 is arranged inside the vibration motor avoidance hole 331.

In addition, the electronic components 6 and 7 are mounted on the lower surface side of the substrate 2 and protrude downward. Further, in FIG. 2, the electronic components 6 and 7 are schematically illustrated, and any of various components such as an IC package, a capacitor, a transformer, a resistor, and the like are assumed to be the electronic components.

Here, as also illustrated in FIG. 3, electronic component avoidance holes 332 and 333 are formed in the support portion 33. The electronic component avoidance holes 332 and 333 are through holes that are arranged so as to interpose the vibration motor avoidance hole 331 from both sides in the lateral direction and penetrate in the top-bottom direction. The electronic components 6 and 7 are disposed inside the electronic component avoidance holes 332 and 333, respectively.

The vibration motor and the electronic components may be mounted on the upper surface of the substrate 2; however, as in the present embodiment, they may be mounted on the lower surface of the substrate 2, so that it is possible to reduce the thickness of the touchpad module 1 in the top-bottom direction by avoiding interference of each component with the support portion 33 by the corresponding avoidance hole.

In addition, because the vibration motor avoidance hole 331 and the electronic component avoidance holes 332 and 333 are separate, there is no need to form an unnecessarily large through hole in the support portion 33, and the strength of the support portion 33 can be improved. In addition, because the vibration motor avoidance hole 331 and the electronic component avoidance holes 332 and 333 can be formed by forming the plate portion 3 by punching, production efficiency can be improved.

Further, in the case where the vibration motor 5 and the electronic components 6 and 7 protrude downward to the bottom portion of the holder 50, which will be described later, through holes for avoiding the vibration motor 5 and the electronic components 6 and 7 are formed in the bottom portion.

In the touchpad module 1 of the present embodiment, the vibration direction of the vibration motor 5 and the urging direction of the spring portions 32A to 32D coincide in the lateral direction. As a result, by vibrating the vibration motor 5 by driving the vibration motor 5, the entirety of the touchpad module 1 outputs vibration in the lateral direction as a vibration module. The vibration output at this time becomes large. Furthermore, the assembly property of the touchpad module 1 is good and cost can be reduced.

Because the touchpad 103 (FIG. 1) is installed in the touchpad module 1 as described later, it is possible to apply large lateral vibration to the touchpad 103 and it is possible to give appropriate haptic feedback to a user who brings his or her finger into contact with the touchpad 103.

In particular, it is desirable that the vibration frequency of the vibration motor 5 be made to coincide with the resonance frequency of the vibration system including the support portion 33, the substrate 2, and the spring portions 32A to 32D. As a result, this makes it possible to further increase the vibration output of the touchpad module 1.

In addition, because the vibration motor 5 is disposed at the center of the support portion 33, it is possible to suppress inclination of the support portion 33 and to increase the vibration output of the touchpad module 1. In addition, because the electronic components 6 and 7 are disposed on both sides of the vibration motor 5 in the lateral direction, it is possible to suppress inclination of the support portion 33 and increase the vibration output of the touchpad module 1.

In addition, in order to increase the vibration output of the touchpad module 1, it is preferable that the vibration motor 5 be constituted by a lateral linear vibration motor.

Figure 4:
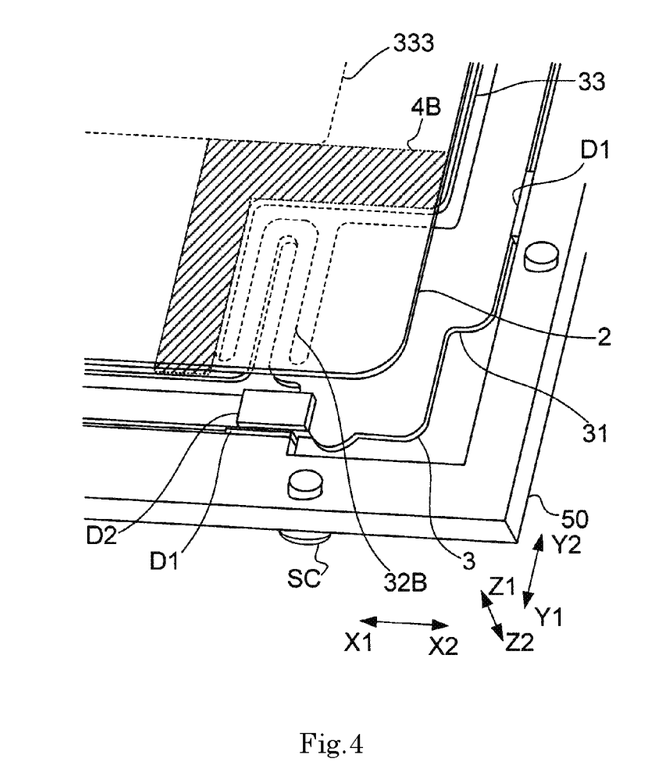
FIG. 4 is a partially enlarged perspective view of FIG. 2.

Next, mounting of the touchpad module 1 on the notebook PC 100 will be described. FIG. 4 is a partially enlarged perspective view of FIG. 2. In FIG. 4, first dampers D1 and second dampers D2 are illustrated.

The plate portion 3 is stored inside the holder 50. The first dampers D1 are disposed between the outer side surface portion of the outer frame portion 31 and the inner side surface portion of the holder 50, and are fixed to both of the outer side surface portion of the outer frame portion 31 and the inner side surface portion of the holder 50. In order to fix the first dampers D1, for example, an adhesive tape is used. The first dampers D1 are disposed at both side portions of each of edges in the lateral direction that face each other in the longitudinal direction of the holder 50, together with both side portions of each of edges in the longitudinal direction that face each other in the lateral direction of the holder 50. That is, a total of eight first dampers D1 are used.

In this manner, the outer frame portion 31 is held by the holder 50 by being fixed to the holder 50 via the first dampers D1.

Figure 5:
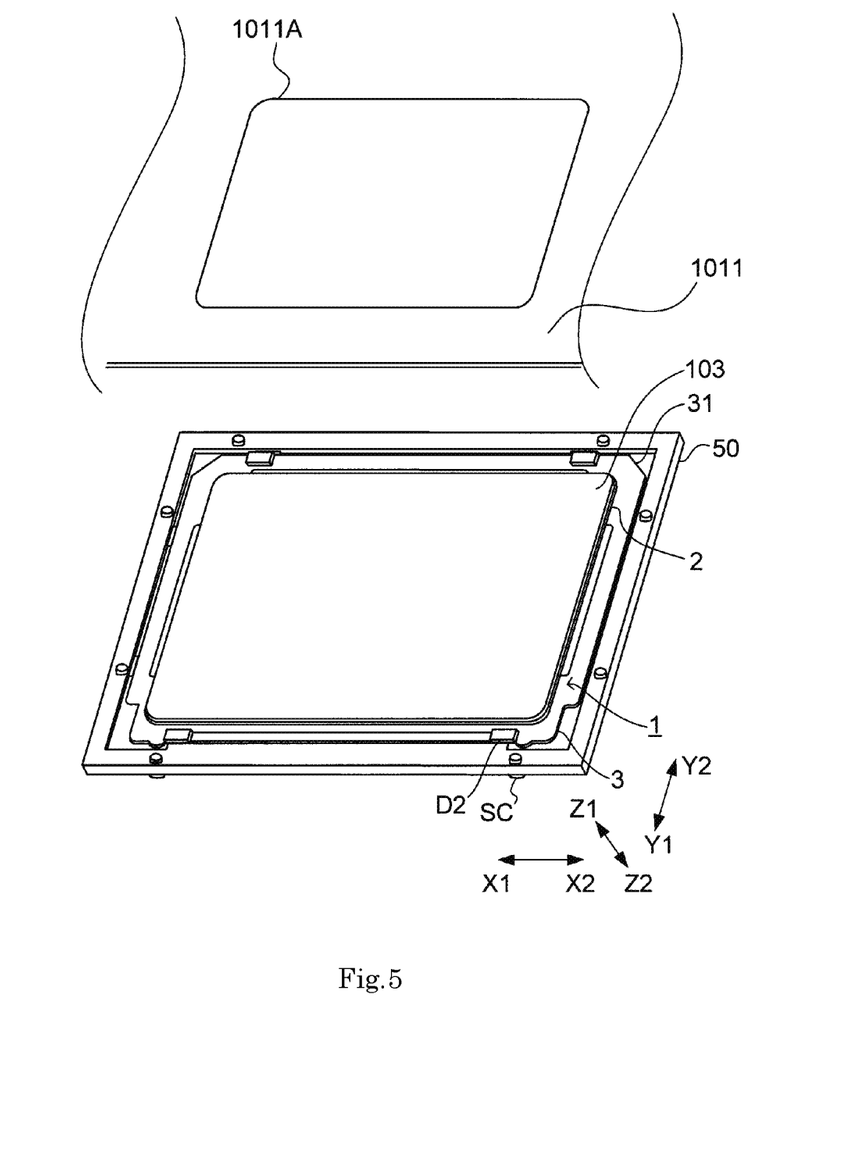
FIG. 5 is a partially exploded perspective view illustrating a state in which a touchpad is installed in the touchpad module, and a configuration of the upper portion of the casing of the notebook PC.

In addition, FIG. 5 is a partially exploded perspective view illustrating a state in which the touchpad 103 is installed in the touchpad module 1 and a configuration of the casing upper portion 1011 of the notebook PC 100. Further, FIG. 5 illustrates only the main portion of the casing upper portion 1011.

As illustrated in FIG. 5, the touchpad 103 is fixed to the substrate 2. The touchpad 103 is fixed by, for example, an adhesive tape or the like. As a result, the vibration output of the touchpad module 1 is propagated to the touchpad 103. The touchpad 103 is exposed upward through the opening portion 1011A.

The touchpad module 1 and the holder 50 are disposed on the lower side of the casing upper portion 1011. The holder 50 is screwed to the casing upper portion 1011 with a plurality of screws SC. The screws SC are disposed at both side portions of each of edges in the longitudinal direction that face each other in the lateral direction of the holder 50, together with both side portions of each of edges in the lateral direction that face each other in the longitudinal direction of the holder 50.

As a result, because the holder 50 holding the touchpad module 1 is fixed to the casing upper portion 1011 by screwing, it is easy to incorporate the touchpad module 1 into the notebook PC 100. In addition, because the outer frame portion 31 is fixed to the casing upper portion 1011 via the first dampers D1 and the holder 50, even if the vibration output of the touchpad module 1 is increased, propagation of vibration to the notebook PC 100 can be suppressed. As a result, it is possible to suppress discomfort to the user who uses the notebook PC 100.

In addition, as illustrated in FIG. 4 and FIG. 5, the plurality of the second dampers D2 are arranged on the upper surface of the outer frame portion 31. The second dampers D2 are arranged near the four corners of the outer frame portion 31. The second dampers D2 are interposed in the top-bottom direction by the casing upper portion 1011 and the outer frame portion 31. The second dampers D2 make contact with both of the casing upper portion 1011 and the outer frame portion 31, but are not fixed thereto. That is, no adhesive or the like is used for the second dampers D2.

When the second dampers D2 are used, vibration of the outer frame portion 31 in the lateral direction at the time of vibration output of the touchpad module 1 can be suppressed.

In addition, dampers (not illustrated) are installed to oppose the second dampers D2 in the top-bottom direction with the outer frame portion 31 interposed therebetween. That is, the dampers are interposed in the top-bottom direction by the outer frame portion 31 and the holder 50. In other words, the outer frame portion 31 is interposed in the top-bottom direction by the second dampers D2 and the non-illustrated dampers. As a result, because the outer frame portion 31 (the touchpad module 1) comes into contact with the casing upper portion 1011 and the holder 50 only via the dampers, it is possible to suppress the vibration from directly propagating to the casing.

As described above, the touchpad module (1) according to the present embodiment is a touchpad module for vibrating a touchpad (103), and includes an outer frame portion (31), a support portion (33) disposed inside the outer frame portion, spring portions (32A-32D) connecting the outer frame portion and the support portion to each other, a substrate (2) fixed to and supported by the support portion, and a vibration motor (5) mounted on the substrate, wherein a vibration direction of the vibration motor and an urging direction of the spring portions coincide in the lateral direction.

According to such a configuration, as a result of the vibration motor vibrating in the lateral direction, the entire touchpad module outputs vibration in the lateral direction as a vibration module. The vibration output is increased and the assembly property is good.

In addition, the vibration frequency of the vibration motor coincides with the resonance frequency of the vibration system including the support portion, the substrate, and the spring portions. As a result, the vibration output of the touchpad module can be increased.

In addition, each of the spring portions has a bent shape, and the outer frame portion, the support portion, and the spring portions are formed as one plate-like member (3). As a result, it is possible to manufacture a structure in which the outer frame portion, the support portion, and the spring portions are connected by punching out from one plate and productivity can be improved. In addition, it is possible to reduce the thickness of the touchpad module.

In addition, the support portion has through holes (331, 332, and 333) in which the vibration motor and electronic components (6 and 7) mounted on the substrate are disposed. This makes it possible to reduce the thickness of the touchpad module. In addition, when the outer frame portion, the support portion, and the spring portions are one plate-like member, the through holes can be efficiently formed by punching.

In addition, the through holes include a vibration motor avoidance hole (331) in which the vibration motor is disposed and electronic component avoidance holes (332 and 333) in which the electronic components are disposed, and the vibration motor avoidance hole and the electronic component avoidance holes are separate from each other. As a result, there is no need to form an unnecessarily large through hole in the support portion and the strength of the support portion is improved.

In addition, the substrate is fixed to the support portion with adhesive tapes (4A to 4D). This makes it easier to fix the substrate. In addition, the adhesive tapes function as spacers and it is possible to avoid interference between the substrate and the outer frame portion when the substrate vibrates.

In addition, the vibration motor is located at the center of the support portion. As a result, inclination of the support portion is suppressed and the vibration output of the touchpad module is further increased.

In addition, the electronic components mounted on the substrate are disposed on both sides of the vibration motor in the lateral direction. As a result, inclination of the support portion is suppressed and the vibration output of the touchpad module is further increased.

In addition, the outer frame portion is fixed to a casing (101) of a device (100) including the touchpad via dampers (D1). As a result, even if the vibration output is increased, propagation of vibration to the equipment can be suppressed. This makes it possible to suppress discomfort to the user who uses the device.

The outer frame portion is fixed via the dampers to a holder (50) screwed to the casing. As a result, because the structural unit holding the touchpad module in the holder is screwed to the casing, it is easy to incorporate the touchpad module into the device.

In addition, the dampers are disposed between the outer side surface portion of the outer frame portion and the inner side surface of the holder, and other dampers (D2) separate from the dampers are interposed in the top-bottom direction between the upper surface of the outer frame portion and the casing. As a result, when the vibration motor vibrates in the lateral direction, vibration of the outer frame portion in the lateral direction can be suppressed.

In addition, the vibration motor is a lateral linear vibration motor having a substrate portion and a vibrating body vibrating in a direction parallel to the substrate portion. As a result, the vibration output of the touchpad module can be increased.

In addition, the device according to the present embodiment includes the touchpad module of any one of the above configurations and a touchpad. As a result, the touchpad can be made to sufficiently vibrate by the touchpad module and haptic feedback can be appropriately given to the user who operates the touchpad.

Although the embodiment of the present invention has been described above, various modifications can be made to the embodiment as long as they are within the scope of the gist of the present invention.

For example, the touchpad may be fixed to the upper portion of the casing, and the touchpad may be vibrated by transmitting the vibration output by the touchpad module to the touchpad via the upper portion of the casing.

In addition, in the foregoing description, the outer frame portion 31, the support portion 33, and the spring portions 32A to 32D are formed of the same member by using the plate portion 3, but these components may be separate members. In this case, the spring portions can be optimized and the vibration output can be increased.

In addition, the touchpad module according to the present invention is not limited to a notebook PC, but can be mounted on any of various devices such as a tablet computer, a smartphone, and the like.

The present invention can be used, for example, for vibrating a touchpad of a notebook PC.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A touchpad module for vibrating a touchpad, the touchpad module comprising:
   an outer frame;
   a support inside the outer frame;
   a spring that connects the outer frame and the support to each other;
   a substrate fixed to and supported by the support; and
   a vibration motor mounted on the substrate; wherein
   a vibration direction of the vibration motor and an urging direction of the spring coincide in a lateral direction;
   the spring includes a bent portion; and
   the outer frame, the support, and the spring are defined as a single monolithic member punched out from a single flat plate.

2. The touchpad module according to claim 1, wherein a vibration frequency of the vibration motor coincides with a resonance frequency of a vibration system including the support, the substrate, and the spring.

3. The touchpad module according to claim 1, wherein the support includes a through hole in which the vibration motor and an electronic component mounted on the substrate are provided.

4. The touchpad module according to claim 3, wherein
   the through hole includes a vibration motor avoidance hole in which the vibration motor is disposed, and an electronic component avoidance hole in which the electronic component is provided; and
   the vibration motor avoidance hole and the electronic component avoidance hole are separate from each other.

5. The touchpad module according to claim 1, wherein the substrate is fixed to the support with an adhesive tape.

6. The touchpad module according to claim 1, wherein the vibration motor is located at a center of the support.

7. The touchpad module according to claim 6, wherein an electronic component mounted on the substrate is provided on each side of the vibration motor in a lateral direction.

8. The touchpad module according to claim 1, wherein the outer frame is fixed to a casing of a device including the touchpad via a damper.

9. The touchpad module according to claim 8, wherein the outer frame is fixed via the damper to a holder screwed to the casing.

10. The touchpad module according to claim 9, wherein
    the damper is between an outer side surface portion of the outer frame and an inner side surface of the holder; and
    another damper separate from the damper is interposed in a top-bottom direction between an upper surface of the outer frame portion and the casing.

11. The touchpad module according to claim 1, wherein the vibration motor is a lateral linear vibration motor including a substrate and a vibrating body vibrating in a direction parallel or substantially parallel to the substrate.

12. A device comprising:
    the touchpad module according to claim 1; and
    a touchpad.

* * * * *